United States Patent [19]

Roberts

[11] 3,813,500

[45] May 28, 1974

[54] ALARM SYSTEM UTILIZING TELEPHONE TALKING PAIRS

[75] Inventor: Walter L. Roberts, Hickory, N.C.

[73] Assignee: Superior Continental Corporation, Hickory, N.C.

[22] Filed: Feb. 18, 1970

[21] Appl. No.: 12,240

Related U.S. Application Data

[63] Continuation-in-part of Ser. No. 815,321, April 11, 1969.

[52] U.S. Cl. .................. 179/175.2 C, 179/175.3 R

[51] Int. Cl. .......................................... H04m 3/08

[58] Field of Search ............ 179/175.3, 175.2 C, 5; 324/51; 340/172, 213, 253

[56] References Cited

UNITED STATES PATENTS

| | | | |
|---|---|---|---|
| 2,724,745 | 11/1955 | Brewer | 340/172 |
| 2,971,183 | 2/1961 | Gill et al. | 340/213 |
| 3,009,110 | 11/1961 | Cole et al. | 340/172 |
| 3,120,579 | 2/1964 | Stewart | 179/5 |
| 3,268,881 | 8/1966 | Vasel | 340/213 |
| 3,412,395 | 11/1968 | Kiene | 340/253 |
| 3,444,336 | 5/1969 | Holt et al. | 179/175.3 |
| 3,484,553 | 12/1969 | Lovell | 179/5 |

*Primary Examiner*—Kathleen H. Claffy
*Assistant Examiner*—Douglas W. Olms
*Attorney, Agent, or Firm*—Roy B. Moffitt

[57] ABSTRACT

Disclosed herein is a fail-safe alarm system virtually transparent to a telephone subscriber circuit. The alarm system is adapted for use with a telephone transmission pair (electrical conductors) in conjunction with any vending machine or a pay-station telephone and is employed to detect not only the attempted vandalism of the coin box, its location, but also a filled coin box as well. Normally closed contacts of a switch device in a vending machine or telephone paystation coupled with a "high-value" resistor make up a leakage path, and current flowing through this leakage path also flows through a "low-value" resistor. This resistor is a basic part of an alarm circuit, the alarm circuitry bridging the talking pair. The resulting voltage drop across this last-mentioned resistor is used to reverse bias a transistor in the alarm circuit, thereby keeping an alarm from sounding. Coin box vandalism and/or a filled coin box causes the contacts of a switch device to open, thereby removing the leakage path ("high-value") resistor from the alarm circuitry. This electrical condition causes the alarm circuitry to conduct thereby causing an alarm to be activated at a central office.

18 Claims, 5 Drawing Figures

WALT ROBERTS
INVENTOR.

BY Roy B. Moffitt
ATTORNEY

WALT ROBERTS
INVENTOR.
BY Roy B. Moore
ATTORNEY

WALT ROBERTS
*INVENTOR.*

Roy B. Morris

ATTORNEY

WALT ROBERTS
*INVENTOR.*

Roy B. Moffitt
ATTORNEY

INVENTOR
WALT ROBERTS
BY ROY B. MOFFITT
ATTORNEY

ALARM SYSTEM UTILIZING TELEPHONE TALKING PAIRS

CROSS-REFERENCE TO RELATED APPLICATIONS

The instant application is a continuation-in-part of U.S. Pat. application, Ser. No. 815,321, filed April 11, 1969, by Walter L. Roberts.

BACKGROUND OF THE INVENTION

This invention is generally concerned with circuitry for monitoring the condition of a coin box, be this coin box a part of a telephone paystation or a vending machine of any sort. The circuitry involved causes an alarm to sound when a coin box has been removed or vandalized and/or the coin box is filled. Once a coin box is either vandalized or is filled, an identifying signal is produced in a central office indicating such conditions; additionally, the exact location of the coin box can be determined.

Unfortunately for society, the problem of coin box vandalism is increasing day by day. The mere presence of a coin box at some lonely spot, not subject to frequent police surveillance or civilian traffic, has been enough to make coin boxes of vending machines and telephone paystations prime targets for vandals bent on stealing the few coins that may be in the coin box. Even organized crime has turned its attention to stealing from coin boxes. Not only telephone paystation coin boxes and vending machines, but parking meters as well have been targets of regular "collection" by the Mafia. This unsavory segment of society has reached a high degree of sophistication in its larcency of collected coins by means of replacing the locks on coin boxes with locks to which this organization has the appropriate keys.

Aside from the loss of revenue, vandalism of coin boxes is the most injurious because of the cost of repair. Coin boxes have been prime targets for vandals bent on stealing, even when there is little or no money in the box. For example, dope addicts, driven by their physiological desire for additional drugs, have done expensive damage to telephone paystations. Furthermore, coin boxes of telephone paystations have been subjected to damage by irate subscribers, when these subscribers have failed to follow instructions printed and posted for their benefit.

Not only would it be advantageous for telephone companies and vending machine operators to know that a coin box has been vandalized, or that its coin box is filled, it would also be advantageous to know where that coin box was located and the time the vandalism or filled coin box was achieved. Such information would enable the owners or operators to inform their coin-collecting employees, or to inform police authorities that such vandalism was taking place. Such timely information could give police authorities an advantage in apprehending the culprits responsible.

The alarm system disclosed herein activates an alarm at the central office, which normally would not be audible to a vandal. However, it is not beyond the pale of the instant invention to provide an on-premise audible alarm device that would be activated at the same time the alarm system at a central office is energized. Once one of only ordinary skill in the art is possessed of the information disclosed in the instant disclosure, such a modification, as mentioned above, would be obvious.

Aside from the fact that police authorities would be given an advantage in apprehending coin box vandals, improved maintenance would be achieved because not only would the operating companies know that a coin box had been damaged, but also the location of that box would be known. For example, a damaged telephone paystation could be put back into service more quickly because the maintenance crews would not have to rely upon happenstance notification that such a paystation was out of order. Consequently, revenues to the telephone company would be increased as downtime for telephone paystations would be decreased. To these desirable ends, the instant invention is directed.

SUMMARY OF THE INVENTION

The instant invention envisions circuitry that is not only transparent to the telephone subscriber circuit, but can also sound an alarm in a central office as well as disable a paystation telephone once vandalism has been attempted or a coin box has been filled. This feature prohibits customers, subsequent to vandalism, or a filled coin box, from using the paystation. If a coin box of a telephone paystation were removed, then a subsequent use of the telephone paystation would allow the user to retrieve his own coin and to make his telephone calls free of charge. Therefore, the feature of disabling the paystation telephone, once vandalism has been attempted, would force subsequent telephone paystation users to seek out another paystation. Also, this feature would act to increase revenues to a telephone company. Additionally, once a telephone paystation coin box is filled, the deactivation of the telephone serves to keep an otherwise honest subscriber from jamming up the coin chutes in the paystation in his attempt to activate the telephone. Such a feature saves maintenance costs on jammed coin chutes.

A characteristic of prior art alarm systems is that these systems usually depend upon employment or use of a spare or defective cable pair. Especially in the area of telephone paystations, the talking pairs reserved for such service usually have transmission electrical characteristics that would not be tolerated by private subscribers. Most prior art teaches that a telephone pair dedicated for alarm function is useful only for alarm sensing purposes. Thus, this pair can have no utility for a message and therefore income-producing functions. With the instant invention, message-carrying, income-producing talking pairs are used, the alarm system being transparent to these telephone subscriber pairs.

The instant invention also envisions a means (test circuitry) that when activated during the sounding of an alarm (in the presence of an actual coin-box disturbance or a filled coin box) that turns off the alarm. This particular circuitry indicates that the alarm circuit itself is operative, i.e., it is indeed detecting a true coin box disturbance or a filled coin box, and that the alarming condition is not produced by something other than the conditions desired to be detected. Also disclosed by the instant invention is a means (test circuitry) that when activated, under no actual filled coin box or coin box disturbance, the alarm circuit will become activated notwithstanding, and an alarm will be sounded, indicating that the alarm circuit itself is operating properly and not influenced by a variable other than the conditions desired to be detected.

With the foregoing in mind, the primary object of the present invention is to provide an improved circuit means, using telephone talking pairs, for continuous monitoring of coin boxes to determine whether or not a coin box has been disturbed and/or a filled condition has been reached.

Another object, is to utilize working cable pairs for monitoring of a coin box of a vending machine or a paystation telephone without impairing the usefulness of telephone cable pairs for normal commercial service.

Another object is to provide a telephone paystation coin box monitoring system, which automatically signals a coin box disturbance or a filled coin box condition without requiring interrogation.

Another object is to provide a coin box monitoring system in which normally closed switches are positioned in such a manner so that either the filling of the coin box or a disturbance of the coin box activates an alarm.

A further object of the instant invention is to provide an alarm system circuitry that can be quickly and easily tested to determine whether or not the alarm circuit system itself is working properly during either an alarming, or non-alarming condition.

These and other objects will become apparent from the description which follows and from the drawings, in which:

DESCRIPTION OF THE PREFERRED EMBODIMENTS

The invention, in general, is directed to providing a plurality of switches at selected and known telephone paystations or coin box vending machines. Each switch is placed in such a manner so as to allow it to detect either a vandalized or filled coin box. An opening of the switch acts to remove a predetermined high resistance from across the tip and ring talking pair of a telephone transmission line. This resistance preferably is in the order of 27,000 ohms. Also, resistors having values substantially higher than the resistance corresponding to a telephone set utilizing the cable pair are used. This last-mentioned resistance may be, for example, in the order of 200 ohms. For each such cable pair having a switch, auxiliary monitoring circuitry is provided at the central office. Such circuitry acts to continuously monitor the condition of the switch (closed or open) even when the cable pair is being used by a subscriber, i.e., when the subscriber handset is in the "off-hook" position.

Whenever an on-premise switch is open, the telephone set may be disabled simultaneously with the activation of the monitoring circuit. Such activation is brought about by an absence of current that previously flowed through a leakage path resistance. Because of the absence of leakage path current flow, or current flow through the telephone handset itself, responsively, current then flows through a transistorized alarm circuitry and activates an alarm in the central office. This alarm can be visual, or audible, or both, but in either case, acts to call the central office operator's attention to either a filled and/or a vandalized coin box along with its location. A central office operator is thus not required to sequentially interrogate the condition of each of a series of switches, as in the usual prior art, or to interrogate a plurality of switches on a single cable pair, but rather is automatically advised by a signal, (audible or visual), whenever any switch is open.

Figure 1:
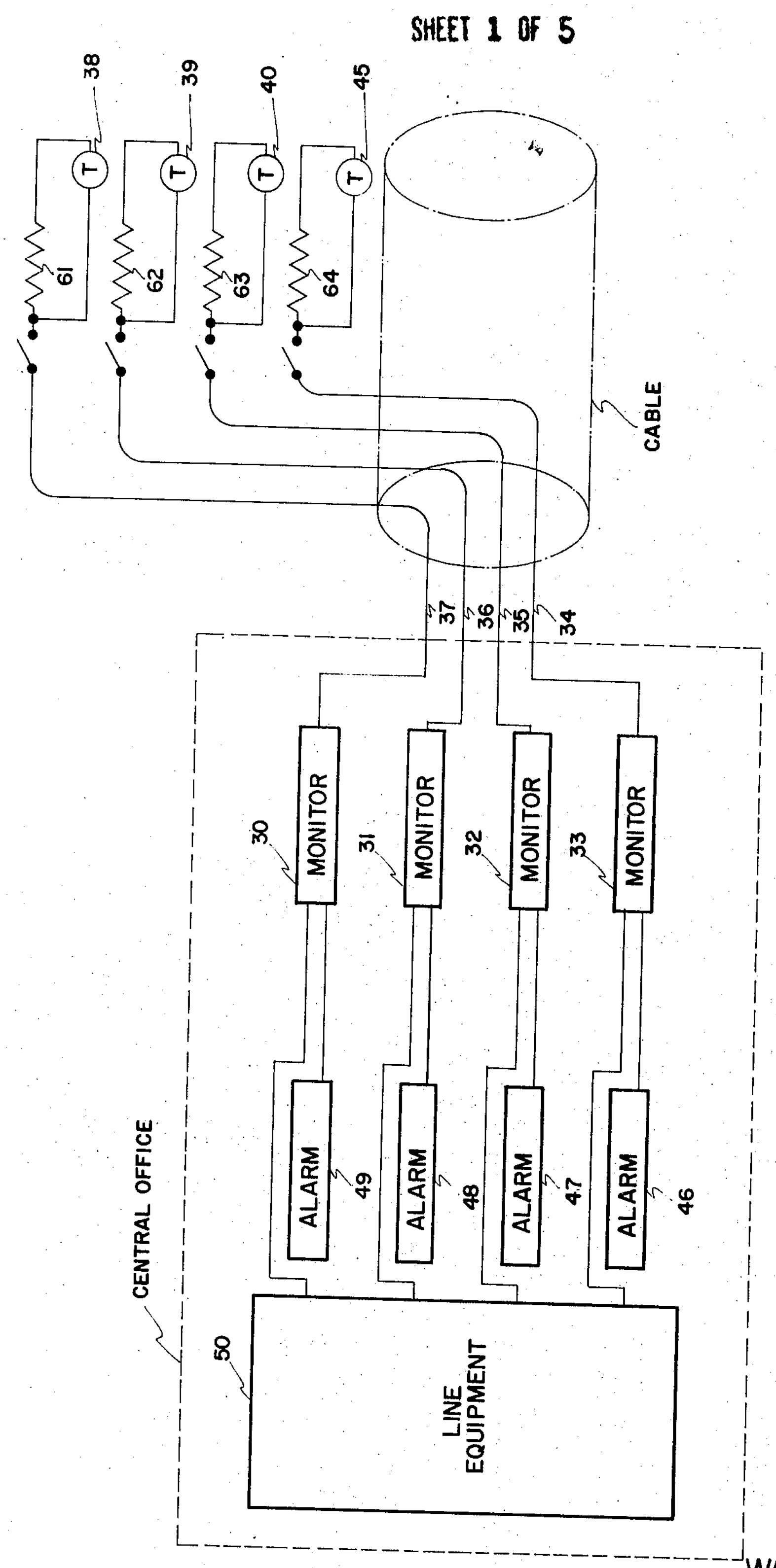
FIG. 1 is a generalized diagram of a telephone cable system serving a plurality of coin boxes incorporating the invention.

In FIG. 1, there is shown a somewhat generalized diagram in which a cable encloses representative working cable pairs 34, 35, 36 and 37. Switches 42, 43, 44 and 51 are located at predetermined coin box locations along the length of the cable 41 and the cable pairs also service the telephones numbered respectively 38, 39, 45 and 40. Obviously, the coin boxes may or may not be at the same geographic location of the coin box. At the central office, there is the usual central office equipment 50. For each of the cable pairs 34, 35, 36 and 37 being used, there is provided a monitor circuit and an alarm. The monitors are shown as elements 30, 31, 32 and 33 and alarms 46, 47, 48, and 49. As is explained in more detail later in the description, each of the monitor circuits 30, 31, 32 and 33, will activate its respective alarm whenever the corresponding switch is opened, indicating a vandalized and/or filled coin box. Thus, for example, if switch 51 was rendered open from its normally closed position, monitor 30 will activate the alarm 49. If the subscriber attempts to put the corresponding telephone 38 into use during alarming conditions, the subscriber may find the telephone disabled. If switch 51 is closed, monitor 30 will continuously monitor its condition through cable 37, even when telephone 38 is, or is not, being used. Upon switch 51 being opened, alarm 49 will be activated and telephone 38 may be simultaneously deactivated. When switch 51 is closed, use of telephone set 38 by a subscriber will not cause activation of the alarm because when a telephone set is placed into actual service, current flowing through that telephone set and onto the cable pairs also flows through a biasing resistor. Current that flows through switch 51 also flows through this same resistor. Not only is this last-mentioned resistor an integral part of the alarm monitoring circuit itself, but it is in series with and placed in one of the legs of the cable pairs. Current flowing through this resistance causes a biasing voltage drop and the transistorized circuitry of the alarm system consequently becomes biased, (non-conducting). Such an electrical state does not permit current to flow through the alarm monitoring circuitry. Consequently, it being only when current flows through the alarm monitoring circuitry that an alarm sounds, there is no alarm activation when switch 51 is closed.

Upon a coin box being filled and/or vandalized, switch 51 is opened. With the circuitry in this state, current no longer flows through telephone set or leakage path; therefore, the biasing voltage drop across the resistor is not then present and the telephone itself is disabled. Because of the absence of a voltage drop across the resistor in series with the cable pair (switch 51 in an opened condition), current flows through the monitoring transistorized alarm. In order that current may flow through the monitoring transistorized alarm, the transistorized circuitry must be forward biased and thereby conductive. When this happens, an alarm is activated.

Figure 2:
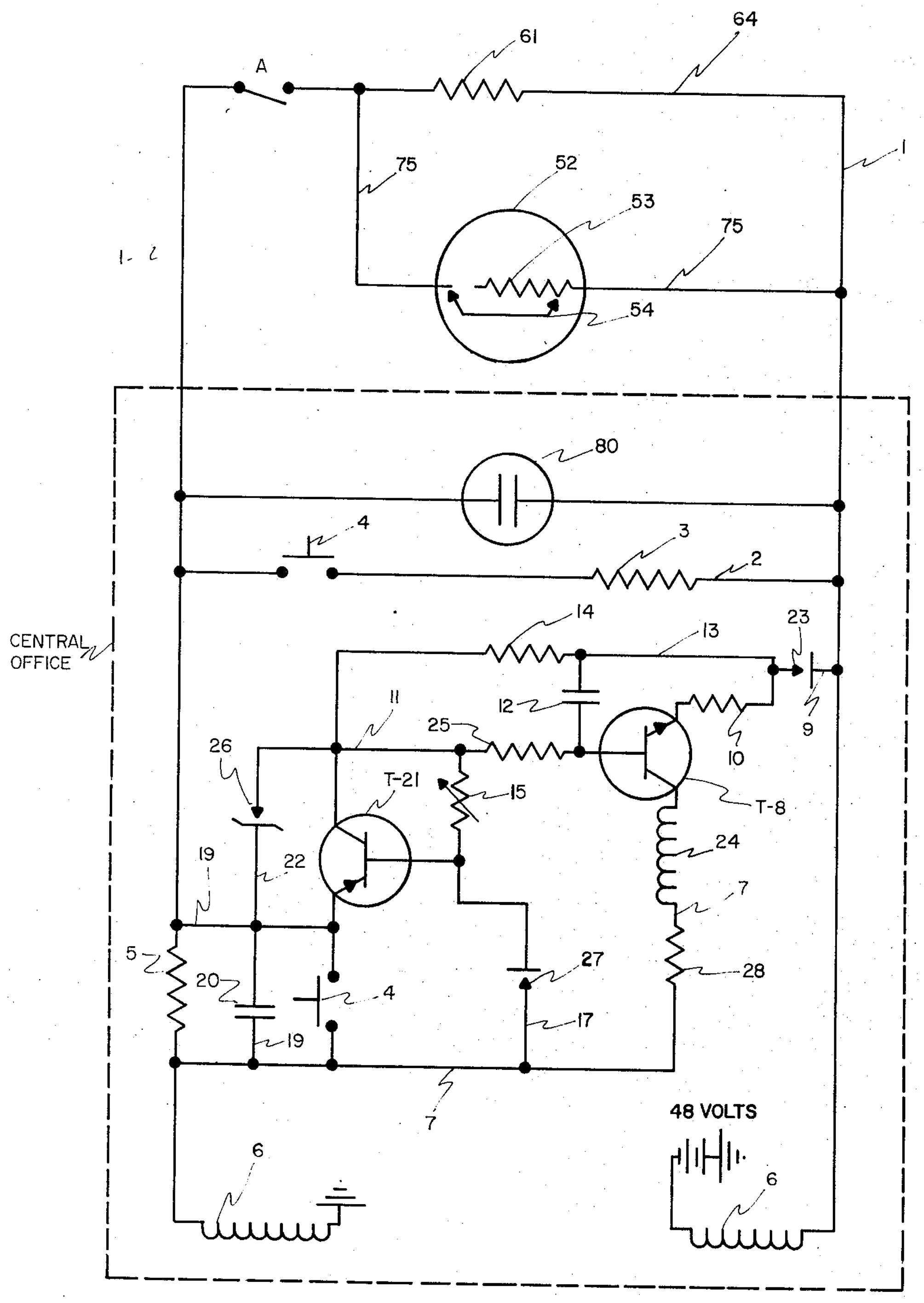
FIG. 2 is a circuit diagram of a system incorporating the invention in conjunction with a single alarm device, sensing either a filled or a disturbed coin box.

Reference is next made to FIG. 2 in which a monitoring and alarm system for one working cable pair is shown. It is to be understood that this same arrangement is duplicated for the number of coin boxes being monitored. In FIG. 2, the lines "1—1" represent the lines forming a cable talking pair for any telephone subscriber line, frequently referred to as the "tip" and "ring." The telephone, which may or may not be at the same location as the coin box, is represented by element 52, the telephone set operative resistance by element 53, and the telephone handset by element 54. A corresponding switch A includes an operative resistor 61. As will be better appreciated from a later description, the values of resistance 53 and resistance 61 vary widely with differing operating conditions, but in one system in which the invention has been employed, the value of resistance 53, i.e., the telephone operative resistance, had an average value of about 3,000 ohms and the value of resistance 61, the switch operative resistor, was selected to be 27,000 ohms.

Lead 64, which connects cable pair 1—1 with switch A and its resistor 61, delineates what is called "a leakage path." Resistor 61 forms the leakage path in an electrically-conductive state so long as switch A remains closed, the closed switch condition representing a non-disturbed or an unfilled coin box. There is at least one resistor-switch combination (A and 61) device for and at each coin box connected to a telephone cable pair. Inasmuch as each cable pair is identified at the central office, (represented generally by coils 6) and a geographic location of each resistor switch combination device on each cable pair is known, a vandalized or filled coin box can be identified as to its precise location.

The alarm activating circuitry is that circuitry, other than coils 6, shown in FIG. 2 and is located in a telephone central office. This circuitry works in conjunction with a leakage path indicated by lead 64 and associated resistor-switch combination (A and 61). The leakage path normally bridges the cable pair with a high resistance, somewhere in the neighborhood of 20,000 to 50,000 ohms. Generally speaking, this resistor, for practical applications, has a value in the neighborhood of 27,000 ohms. The detailed function of which will be disclosed later.

Resistor element 5, having a value in the neighborhood of 50 to 25 ohms is inserted in series with subscriber loop cable pair 1—1 at the central office end, and is capacitor by-passed, see element 20 in lead 19 parallel to resistor 5, to avoid upsetting line balance for voice frequency currents. A solid state alarm activating device monitors the voltage drop across resistor 5 and is responsive to a "normal" 2–3 *m*A minimum current flowing in the cable pair loop. The solid state device can be made up of vacuum tubes or transistors such as T-21 and T-8 — semi-conductor means made from at least three elements for providing no less than two transitions from positive to negative conduction — and associated circuitry. Element 24 is the coil portion of a relay, not completely shown, used to activate any conventional alarm system (not shown). Coil 24, through lead 7 and resistor 28, is in electrical connection with the lefthand member of cable pair 1–1 and the emitter of transistor T-21 through interconnecting lead 19'. The collector of transistor T-21 is in electrical connection with lead 13, which is in turn connected to resistor 14, said resistor being connected through interconnecting lead 13 to diode 23, which is connected electrically to the righthand member of cable pair 1–1. Diode 26 is in electrical connection across the collector and emitter of transistor T-21, by means of lead 22. Capacitor 20, which is the capacitor by-pass for resistor 5, is in electrical connection, by means of leads 19 and 2 and 17, with biasing diode 27, which in turn is in electrical connection with resistor 15 via lead 17. Resistor 15 is base connected to transistor T-21. Capacitor 12 is electrically connected to the base of transistor T-8, the same as resistor 25. The emitter of transistor T-8 is connected to resistor 10, said resistor thence being in electrical connection with the righthand member of cable pair 1–1 through blocking diode 23. The collector of transistor T-8 is connected to coil 24 by means of lead 7, which has been previously described as the coil portion of an alarm relay (not completely shown) used to draw in (activate) contacts of an alarm system (not shown). The central office is represented by a coil 6 and the 48 dc source. Gas tube 80 is bridged across cable pairs 1–1 and is used to protect the circuit against voltage surges from outside sources such as lightning and the like.

Current leakage (2 to 3 *m*A) through closed switch contacts of switch A along lead 64 is enough to reverse bias (turn off, or render non-conductive), transistor T-21, by means of the resulting voltage drop across resistor 5. Such an electrical state can represent a partially filled or undisturbed coin box. Accordingly, no current flows through transistor T-21 during such a condition. Upon either a filling or disturbing of a coin box — the coin box could be associated with either a soft drink or a food dispensing machine, or any coin box for that matter — contacts of switch A are open, and current ceases to flow through lead 1 and through resistor 5. As a result of this electrical state, current then flows through transistor T-21, turning on transistor T-8. Current flowing during alarm conditions through resistor 5 is not sufficient enough in magnitude to reverse bias (turn off) transistor T-21. When transistor T-21 turns on, transistor T-8 is forward-biased as a result of a voltage drop across resistor 14, thus allowing transistor T-8 to turn on, i.e., become conductive. Current flows onto lead 9, through resistor 10 and transistor T-8, onto lead 7 and thence through coil 24, thereby energizing same. This energized coil pulls in (activates) a relay (not shown) thence subsequently sounds an alarm, indicating that either a coin box is full, or vandalism is being attempted. Thus, it can be seen that it is current flowing through transistor T-21 that causes the alarm system to become activated.

Voltage drop across resistor 5 is enough to maintain a reverse-bias of transistor T-21, thereby preventing transistor T-21 to conduct, as opposed to an alarm condition when the voltage drop across resistor 5 essentially disappears and transistor T-21 is forward-biased by resistor 15 and diode 27. As it will be seen later, resistor 15 can be made variable, thereby controlling the amount of voltage drop needed (sensitivity) across resistor 5 to activate the alarm system. When the resistance of resistor 15 is relatively high, the alarm circuitry is less sensitive, i.e., it takes less current flowing in resistor 5 to turn off the alarm. In like manner, when resistor 15 is set to a relatively low-value, then the alarm circuit is more sensitive, i.e., it takes more current flowing through resistor 5 to turn the alarm off.

Zener diode 26 is used to protect transistor T-21 from transient electrical surges. The reason that there are two transistors in the alarm circuit, as opposed to just one, is to achieve a sensitivity of an order to detect small values in circuit conditions. Diode 23 helps to make the installation of the alarm circuit foolproof, because if the alarm circuit were to be hooked up in reverse through inadvertence, the circuit would not operate. Nevertheless, the circuitry would not be harmed from the electrical energy applied to it due to the inadvertent improper installation. This diode 23 also blocks transient surges coming from the cable pair line 1–1 from the alarm circuit itself. Transistor T-21 is a PNP type and transistor T-8 is an NPN type.

The combination of resistor 25 and capacitor 12 creates an RC network with a long time consonant, this arrangement keeping the alarm coil 24 from being responsive to spurious transient currents. Resistor 28 is a current-limiting resistor working in concert with coil 24 to keep the current flowing through transistor T-8 in the order of 1.7 mA.

Switches 4 and 4′, plus associated circuitry therewith, provide means for checking the alarm circuitry per se to determine whether or not the alarm circuitry is properly functioning and not influenced by factors other than a disturbed or filled coin box condition. For example, when there is no true actual disturbed or filled coin box, switch 4′ can be moved from its normally open to a closed position. This switch will activate the alarm and thus check out the alarm monitoring circuitry to see if it itself is properly operative. Basically, the activation of switch 4′ removes (shunts) resistor 5 from the circuit and any corresponding inherent voltage bias applied to transistor T-21. Thus, transistor T-21 becomes conductive when switch 4′ is moved from its normally open to a closed position.

When the alarm-monitoring circuitry is indicating a filled or disturbed coin box by sounding an alarm, the monitoring circuit can be tested to see whether or not there is indeed such conditions present, or whether extraneous factors are causing the alarm to sound. To accomplish this task, one need only to move switch 4 from its normally open, to a closed position. If the alarm condition is due to a filled or disturbed coin box, then the alarm will be turned off, indicating that the circuitry of the monitoring system is properly functioning. Basically, what the closure of switch 4 accomplishes is the electrical connecting of an additional resistor simulating a closed leakage path between cable pairs 1–1. It will be noted that switch 4, which is connected by leads 2 from one side of a transmission cable pair 1–1 to the other side, also includes resistor 3, a resistor having a value of approximately 27,000 ohms.

When switch 4 is moved from its normally open to its normally closed position, this procedure bridges across cable pairs 1–1 a simulated leakage path or simulated resistor having essentially the same value as the leakage path. That is to say, resistor 3 is essentially of the same value as resistor 61, and the placing of lead 2 with resistor 3 across cable pair 1–1 is a simulation of a leakage path formed by elements 61, switch A and element 64.

When a subscriber (element 52) goes "off-hook" during the sounding of an alarm (coil 24 in the energized state), the subscriber, in this embodiment, is unable to complete his call because switch A is open. Inasmuch as switch A is open, current is not permitted to flow through telephone 52. Hence, when the subscriber is in the "off-hook" position, the telephone is deactivated immediately upon the opening of switch A.

The preceding disclosure concerns itself chiefly, if not entirely, with an alarm system that would indicate either a filled, or disturbed coin box, not these two conditions simultaneously. It is to be understood, however, that the instant invention is not limited to an "either" "or" proposition, i.e., the detection of only a filled coin box, or only a disturbed coin box. With appropriate circuitry, either a filled, or a disturbed coin box, can be detected, either singularly, or simultaneously. The following disclosure concerns itself with circuitry appropriate for such use.

Figure 3:
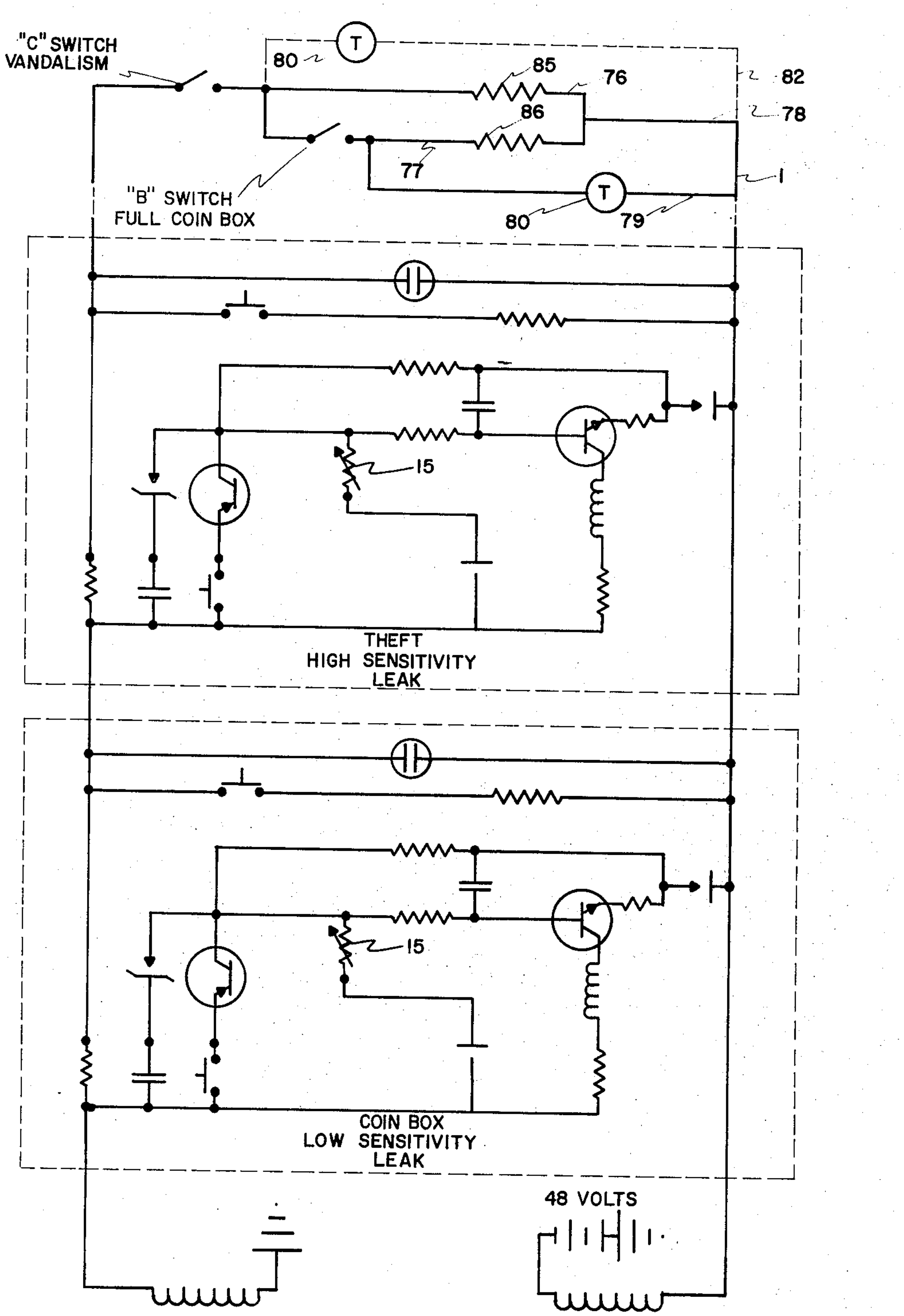
FIG. 3 is a circuit diagram of a system incorporating the invention in a telephone paystation to detect the condition of either a filled and/or a vandalized coin box.

FIG. 3 discloses detailed circuitry appropriate for alarm detection of either a filled or disturbed coin box, singularly, or simultaneously. As indicated in FIG. 3, the central office is designated by an appropriate legend and circuitry components are identified by the same element numbers as used in FIG. 2. Inside of the central office, there are two alarm circuits, 83 and 84, for each telephone paystation or vending machine desired to be monitored. These are attached to a single talking pair 1–1. Circuits 83 and 84 are the same as those alarm circuits shown in FIG. 2, except that resistor 15 is a variable-value resistor instead of a fixed-value resistor. It is customary, but not necessary to use a fixed-value resistor 15 with a single alarm circuit. On the other hand, when two alarm circuits are coupled in series as shown in FIG. 3, resistor 15 is usually of the variable value type.

At the telephone paystation or coin vending machine, whichever the case may be, one side of the telephone talking pair 1–1 is connected to a telephone 80 through lead 79. The same leg of the talking pair 1–1 is connected by lead 78 to lead 77, which in turn is connected to resistor 86 and switch B. It is this switch that when opened indicates a coin box full of coins. Telephone 80 is in electrical contact with lead 77 via lead 79 as shown. Resistor 85 is in parallel connection with resistor 86 via lead 76 and it is in further contact with switch B. Switch C, used to indicate a disturbed or vandalized coin box, is in electrical connection with the other lead of talking pair 1–1 and in electrical connection with lead 76. As shown, telephone 80 — which may or may not be the telephone paystation as the telephone may be a private subscriber and the switches for theft control and full box indication be used for a nearby vending machine — bridges resistor 86 by means of lead 79. An alternative way of arranging telephone 80 is shown by dotted lines and lead 82. By means of this last-mentioned lead, telephone 80 bridges resistor 85 and is in parallel therewith.

When employing the embodiment as shown by the solid lines in FIG. 3, it can be readily appreciated that if either switch B or switch C, (coin box and theft switches respectively) were to open, the telephone would be disabled. On the other hand, if the embodiment as shown in the dotted lines were employed, telephone 80 would only be disabled if switch C were open, i.e., vandalism. When a telephone is in this position, its coin box, when full, will not deactivate the telephone even though an alarm has been activated by alarm circuitry 83.

Resistors 85 and 86 are in parallel combination, as previously stated, and their combined parallel effective resistance is lower than either one of the individual resistors as such. For example, resistor 85 and 86 can be 30,000 ohms each, thereby presenting a 15,000 ohm effective resistance across the talking pair. For such an electrical condition, the sensitivity of alarm circuits 83 and 84 are adjusted, by means of adjusting adjustable resistor 15, so that both circuits 83 and 84 are off, i.e., not conducting current. It will be recalled that to achieve this state, there has to be sufficient voltage drop across resistor 5. When the alarm resistance across talking pair 1–1 is above 15,000 ohms, but less than 30,000 ohms (switch B being in the open position) circuit 83 remains in the "off" state, whereas circuit 84 is turned on, there being sufficient voltage drop across resistor 5 in circuit 84 to keep this circuit turned off. In other words, one circuit is alarming while the other is not if the leakage path resistive value lies within the inclusive range of the lowest value resistor and the series equivalent of parallel resistors 85 and 86.

In the event that there is an attempted vandalism simultaneously with full coin box, switches B and C are both opened. Such a state would present an infinite resistance to talking pair 1–1 and the resistance that would be above 30,000 ohms. When such is the case, both circuits 83 and 84 are both in the "on" state and the alarm is sounding, indicating both a full coin box and an attempted vandalism.

Figure 4:
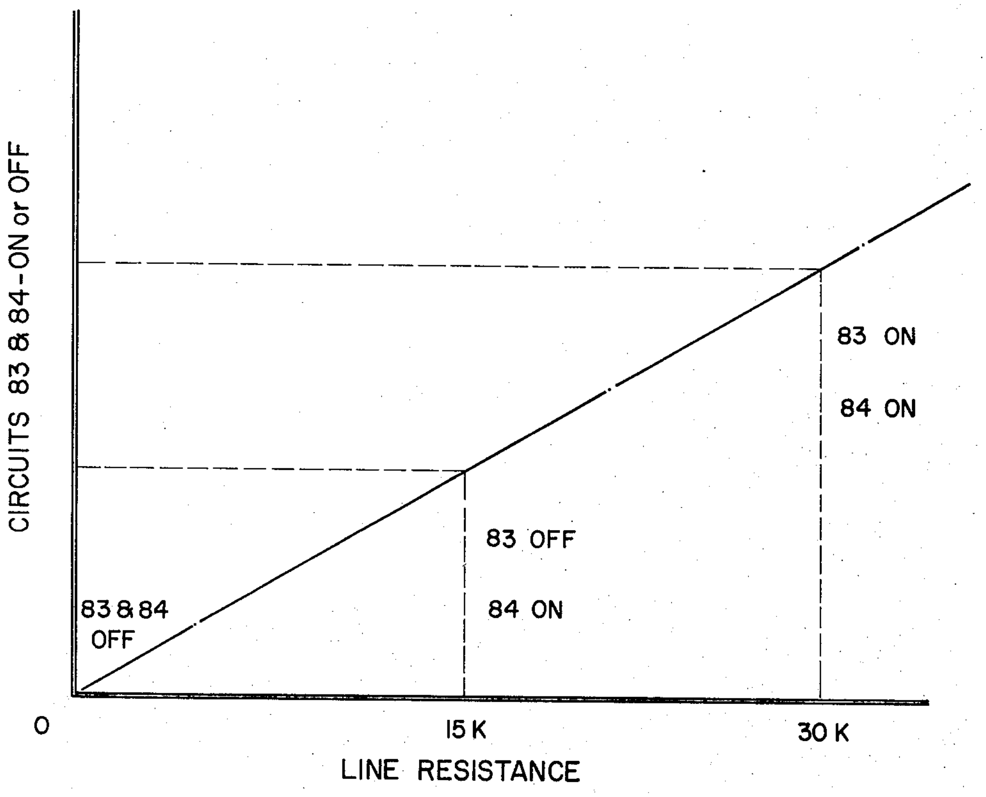
FIG. 4 is a diagram showing the voltages required for "on" and "off" conditions of the alarm circuits shown in FIG. 3.
Figure 5:
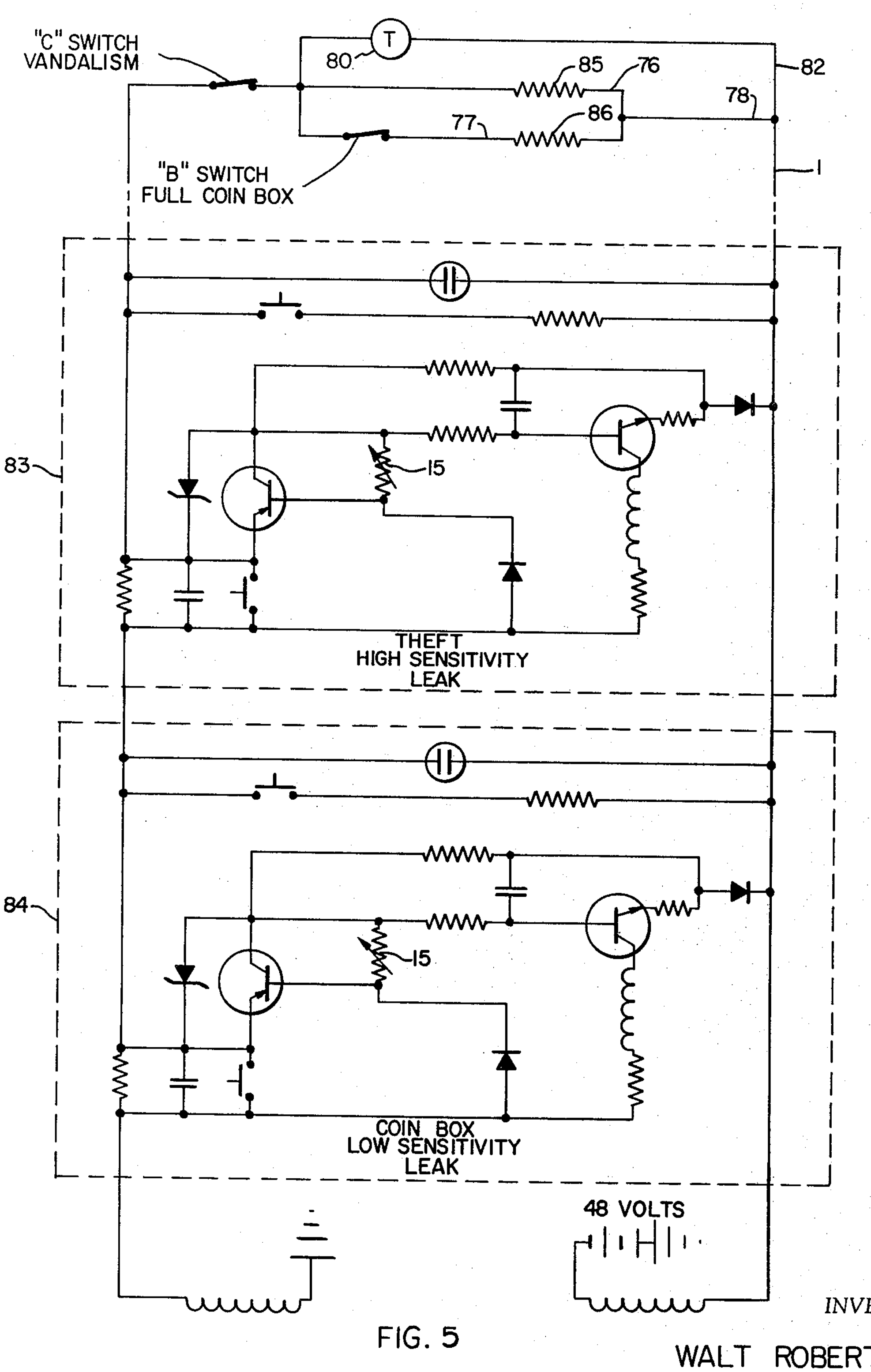
FIG. 5 is a modification of the circuit diagram shown in FIG. 3.

FIG. 4 is a stylized graphic analysis of the foregoing electrical states showing a representative plotting of line resistance versus the turning "on" or "off" of circuits 83 and 84. From this graph, one can readily see that a line resistance between a 0 and 15,000 ohm keeps both circuits 83 and 84 in the "off" position. Any line resistance above that of 15,000 ohms, up to and including 30,000 ohms keeps circuit 83 in the "off" position, but allows circuit 84 to be rendered to the "on" position as previously explained. A line resistance above that of 30,000 ohms causes both circuits 83 and 84 to be rendered to the "on" or alarming state.

From the foregoing disclosure one can readily appreciate that there has been delineated a simple and convenient alarm system utilizing the talking pairs of an existing telephone line. Since this alarm system is transparent to the message-carrying purpose of the telephone talking pair, it can be immediately appreciated that additional revenues for telephone companies can be achieved by merely renting their telephone transmission lines to those business men that are forced to deal with coin boxes. An added feature is the fact that telephone companies providing paystation services can use their own transmission talking pairs to indicate vandalism or a filled coin box at these paystations. Since a singular talking pair is assigned to a particular coin box, be it for vandalism or a filled condition, the location of that particular coin box can be immediately identified by a simple code attached to that particular talking pair at the telephone central office. With this arrangement, business concerns, who are forced to employ coin boxes, can be appraised as to the location of a coin box that is either filled or when it is undergoing vandalism. Modified circuitry has been disclosed that enables one to automatically disable a telephone once a coin box has been filled and/or disturbed. In view of the foregoing and inasmuch as existing transmission lines are utilized with the alarm circuitry of the instant invention, the simplicity and the economics of this particular type of alarm application can be readily appreciated.

From the foregoing, it is believed that the invention may be readily understood by those skilled in the art without further description and it being borne in mind that numerous changes may be made in the details disclosed, without deferring from the spirit of the invention as set forth in the following Claims.

I claim:

1. In a telephone system having a telephone set and a two-conductor transmission line for transmitting signals between said telephone set and a central office terminal, a current leakage network bridged across the conductors of said transmission line and having first and second switch means and first and second resistance means, said first and second resistance means being in parallel with each other and in series with said first switch means, and said second switch means being in parallel with said first resistance means and in series with said first switch means and said second resistance means, said first and second switch means being actuatable respectively in response to first and second different pre-selected conditions, and separate, first and second condition signalling circuits electrically connected to said transmission line, said first signalling circuit being responsive to the condition responsive actuation of said first switch means to signal the occurrence of said first condition, and said second signalling circuit being responsive to the condition responsive actuation of said second switch means to signal the occurrence of said second condition.

2. The telephone system defined in claim 1 wherein said telephone set is connected between said conductors in series with said first switch means and in parallel with said second switch means.

3. The telephone system defined in claim 1 wherein said telephone set is connected between said conductors in series with said first and second switch means.

4. The telephone system defined in claim 1 wherein said first and second signalling circuits respectively comprise first and second alarm activating networks that are bridged across said conductors in parallel relation to each other.

5. The telephone system defined in claim 4 wherein each of said alarm activating networks comprises transistor means for operating an alarm.

6. In a telephone system having a telephone set and a two-conductor transmission line for transmitting signals between said telephone set and a central office terminal, a current leakage network bridged across the conductors of said transmission line and having first and second normally closed switch means and first and second resistance means, said first and second resistance means being in parallel with each other and in series with said first switch means, and said second switch means being in parallel with said first resistance means and in series with said first switch means and said second resistance means, said network providing (a) a first current leakage path through said first and second switch means and said first and second resistance means when both of said first and second switch means are closed and (b) a second current leakage path through said first resistance means and said first switch means when said first and second switch means are respectively closed and opened, said first and second switch means being adapted to open upon the occurrence of first and second different pre-selected conditions respectively, first and second resistors in series with each other and in series with one of said conductors, and first and second condition signalling circuits connected to said transmission line, said second condition signalling circuit being operative to signal the occurence of said second condition in response to the voltage drop developed across said second resistor by current flowing through said second leakage path when said second switch means is opened, and said first condition signalling circuit being operative to signal the occurrence of said first condition in response to the voltage condition at said first resistor when said first switch means is opened to interrupt current flow through said first and second leakage paths.

7. The telephone system defined in claim 6 wherein first and second signalling circuits are rendered inoperative to signal the occurrence of said conditions respectively in response to the voltage drops developed across said first and second resistors by current flowing through said first leakage path and said first and second resistors when said first and second switch means are closed.

8. The telephone system defined in claim 7 wherein said telephone set is connected between said conductors in series with said first switch means and in parallel relation with said second switch means.

9. The telephone system defined in claim 7 wherein said telephone set is connected between said conductors in series with said first and second switch means.

10. The telephone system defined in claim 7 wherein said telephone set is connected between said conductors in series with at least said first switch means, and wherein said first and second signalling circuits are respectively bridged in parallel relation across said conductors.

11. The telephone system defined in claim 10 wherein said first and second signalling circuits respectively comprises first and second transistor means each controlling operation of an alarm, and wherein said first transistor means is activated to operate its alarm only when said first switch means is opened to interrupt the current flow through said first and second leakage paths.

12. A system for monitoring the occurrence of first and second different pre-selected conditions of a coin box and comprising a two-conductor transmission line, a current leakage network bridged across the conductors of said transmission line and having first and second normally closed switch means and first and second resistance means, said first and second resistance means being in parallel with each other and in series with said first switch means, and said second switch means being in parallel with said first resistance means and in series with said first switch means and said second resistance means, said first and second switch means being opened respectively in response to the occurrence of said first and second different pre-selected conditions, and first and second signalling circuits electrically connected to said transmission line, said first signalling circuit being responsive to the opening of said first switch means to signal the occurrence of said first condition, and said second signalling circuit being responsive to the opening of said second switch means to signal the occurrence of said second condition.

13. The system defined in claim 12 wherein said first and second signalling circuits respectively comprise first and second alarm activating networks bridged in parallel relation across said conductors.

14. A monitoring system comprising a two-conductor transmission line, a current leakage network bridged across the conductors of said transmission line and having first and second normally closed switch means and first and second resistance means, said first and second resistance means being in parallel with each other and in series with said first switch means, and said second switch means being in parallel with said first resistance means and in series with said first switch means and said second resistance means, said network providing (a) a first current leakage path through said first and second switch means and said first and second resistance means when both of said first and second switch means are closed and (b) a second current leakage path through said first resistance means and said first switch means when said first and second switch means are respectively closed and opened, said first and second switch means being adapted to open upon the occurrence of first and second different pre-selected conditions respectively, first and second resistors in series with each other and in series with one of said conductors, and first and second condition signalling circuits connected to said transmission line, said second condition signalling circuit being operative to signal the occurrence of said second condition in response to the voltage drop developed across said second resistor by current flowing through said second leakage path when said second switch means is opened, and said first condition signalling circuit being operative to signal the occurrence of said first condition in response to the voltage condition at said first resistor when said first switch means is opened to interrupt current flow through said first and second leakage paths.

15. The monitoring system defined in claim 14 wherein said first and second signalling circuits are rendered inoperative to signal the occurrence of said conditions respectively in response to the voltage drops developed across said first and second resistors by current flowing through said first leakage path and said first and second resistors when said first and second switch means are closed.

16. The monitoring system defined in claim 15 wherein said first and second signalling circuits are bridged in parallel relation across said conductors, one of said resistors being connected in said one conductor between the connections of one of said signalling circuits and said current leakage network to said one conductor, and the other of said resistors being connected in said one conductor between the connections of said first and second signalling circuits to said one conductor.

17. The monitoring system defined in claim 16 wherein each of said first and second signalling circuits comprises transistor means for controlling operation of an alarm.

18. A monitoring system comprising a two-conductor transmission line, a current leakage network bridged across the conductors of said transmission line and having first and second normally closed switch means and first and second resistance means, said first and second resistance means being in parallel with each other and in series with said first switch means, and said second switch means being in parallel with said first resistance means and in series with said first switch means and said second resistance means, said first and second switch means being adapted to open respectively in response to the occurrence of first and second different preselected conditions, first and second signalling circuits electrically connected to said transmission line, said first signalling circuit being responsive only to the opening of said first switch means to signal the occurrence of said first condition, and said second signalling circuit being responsive to the opening of said second switch means to signal the occurrence of said second condition.

* * * * *